May 8, 1956 V. TRUE ET AL 2,745,067
AUTOMATIC IMPEDANCE MATCHING APPARATUS
Filed June 28, 1951 2 Sheets-Sheet 1
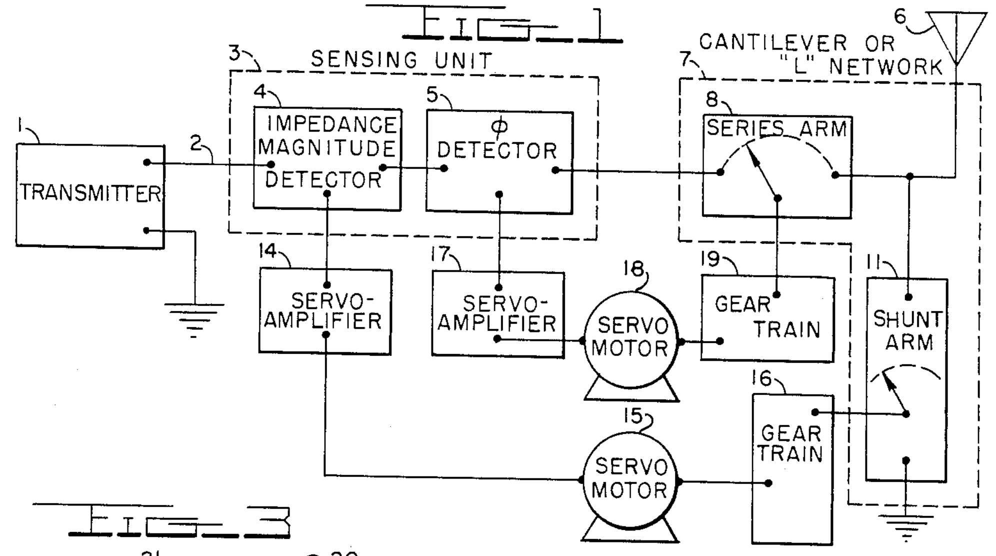
FIG. 1
FIG. 3
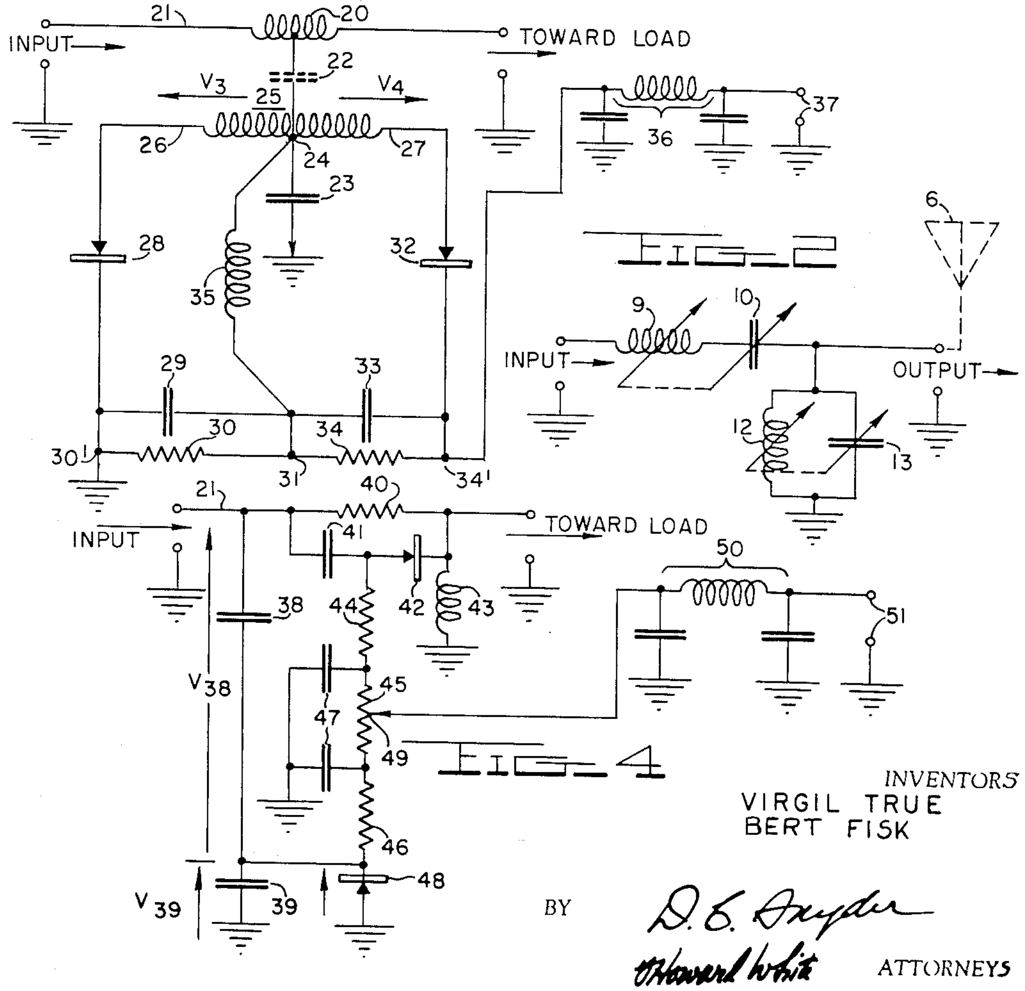
FIG. 2, FIG. 4
INVENTORS
VIRGIL TRUE
BERT FISK
BY D. C. Snyder
Howard White
ATTORNEYS May 8, 1956 V. TRUE ET AL 2,745,067

AUTOMATIC IMPEDANCE MATCHING APPARATUS

Filed June 28, 1951 2 Sheets-Sheet 2

INVENTORS
VIRGIL TRUE
BERT FISK

BY D. C. [signature]
Howard White

ATTORNEYS

United States Patent Office 2,745,067

Patented May 8, 1956

2,745,067

AUTOMATIC IMPEDANCE MATCHING APPARATUS

Virgil True and Bert Fisk, Washington, D. C.

Application June 28, 1951, Serial No. 234,135

8 Claims. (Cl. 333—17)

Figure 5:
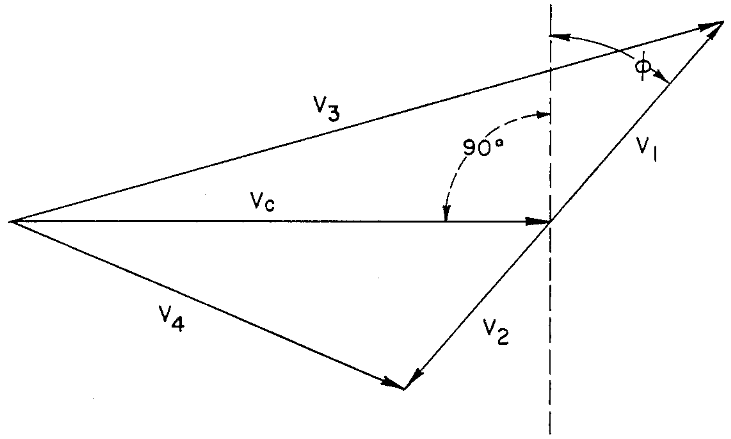

(Granted under Title 35, U. S. Code (1952), sec. 266)

This invention relates to a system for automatically matching impedance magnitude and phase angle with that of a known impedance and has been designed especially for communication transmitters for matching an antenna to a transmission line. In such installations, a matching device is required at the base of the antenna so that the input impedance to the antenna may be matched to the characteristic impedance of the transmission line.

This invention is not limited to use with either transmitters or antennas. This system may be adapted for use in any A. C. circuit. For example, commercial power lines may have their power factors automatically controlled by an embodiment of this invention. Another adaptation of this device is to control the impedance of a dielectric heating device such as disclosed by R. H. Hagopian in the December 1950 issue of "Electronics" on page 98.

Present impedance matching devices are manually operated and may be remotely adjusted only to a fixed number of preset positions. Moreover, it is a complex and time consuming operation to preset these positions. Once set, no allowance is made for changes in input impedance to the antenna due to changing conditions, such as those encountered on a moving ship, where the antenna may be constantly changing its relative position and angle of mounting with respect to the ground plane. In view of these obvious disadvantages it is apparent that a quick acting, fully automatic matching system is desirable.

Accordingly, it is an object of the present invention to provide a system capable of matching an antenna impedance to a transmission line over a wide range of frequencies from the audio range to the ultra-high frequency range without recourse to band switching or manual adjustment of any kind.

It is another object of this invention to supply a matching system that may be used at an infinite number of frequencies in the range specified.

Another object of the invention is to have the impedance match between the antenna and the transmission line so exact that the transmitter can be loaded into a dummy antenna (fixed resistive load) and then switched to the antenna without an appreciable change in the amount of power delivered by the transmitter.

A further object is to have the match between the antenna and transmission line such that the voltage standing-wave ratio on the line never exceeds 1.2.

It is a further object to have a matching system perform an entire matching operation automatically and in a minimum time.

The invention has an additional object of presenting a fully automatic matching system, thereby reducing the complexity of the work performed by operators.

It is another object of this invention to supply a matching system that operates at all times the transmitter is on and is continuously and automatically variable so that compensation will be made for variations in antenna impedance under operating conditions.

It is an additional object to supply a tuning unit for the aforementioned matching system that may be housed and secured in a relatively inaccessible position remote from a transmitter and left without manual adjustment or maintenance for long periods of time.

It is an additional object of the invention to provide an impedance matching system comprising simple, inexpensive parts so that the entire system may be easily replaced if necessary, thus avoiding any necessity for replacing expensive, easily-destructible parts, such as vacuum tubes, in a tedious time-consuming operation.

Another object of the invention is to provide an impedance detector which gives an indication when the load is matched to the transmission line and also indicates the direction of error from the load to be matched.

A further object is to provide a device to detect the phase angle between voltage and current in an electrical circuit by means of an impressed voltage which is a function of this phase angle.

Another object is to provide a cantilever-matching network capable of compensating for the change in impedance in an antenna-loaded line due to a change in frequency over a wide band of frequencies.

Figure 6:
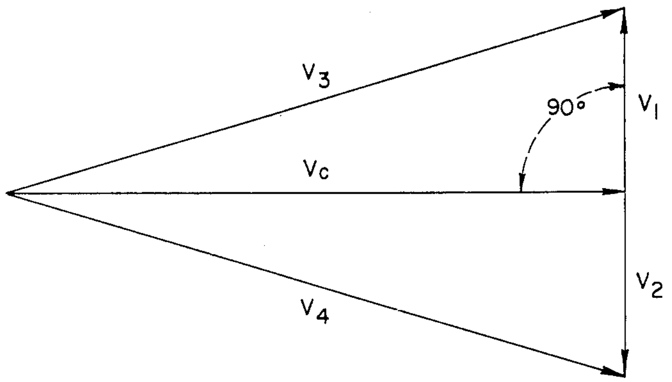

Other objects and features of the invention will be apparent from the following disclosure and the appended drawings; wherein, Fig. 1 is a block diagram of the automatic impedance-matching system of the present invention, Fig. 2 is a schematic diagram of one type of matching network useful in matching the variable impedance of an antenna to a line, Fig. 3 is a schematic diagram of the phase angle detector 5 which is included in the system of Fig. 1, Fig. 4 is a schematic diagram of the impedance-magnitude detector 4 included in the system of Fig. 1, Fig. 5 is a vector diagram of the voltages in the phase angle detector system when the variable load contains reactance elements, and Fig. 6 is a vector diagram of the voltages in the phase angle detector system when the variable load is a pure resistance.

For purposes of illustration, the teachings of the present invention as shown in Fig. 1, are employed to match the impedance of a suitable antenna 6 to a transmission line 2. The latter is shown connected to and excited by a communication transmitter 1. The impedance matching of antenna 6 to line 2 is obtained by connection of the former to the latter through an impedance matching network 7 connected between the load 6 and the line 2. In this example, where the load 6 is an antenna or other device which exhibits both capacitive and inductive reactance qualities with frequency variation, a specialized impedance network 7 is preferred. In particular, this network is a cantilever, or L-type circuit, which, as later described in detail, comprises an adjustable reactive series arm 8 and an adjustable reactive shunt arm 11. The shunt arm 11 is adjusted to transform the input impedance of the antenna to an impedance whose resistive component is equal to the characteristic resistance of the transmission line 2, and the series arm 8 is adjusted to eliminate the reactive component from the parallel impedance of the antenna and the shunt arm 11.

In power applications, such as exemplified herein, where a transmitter is used to excite a load such as antenna 6, the series and shunt arms 8 and 11 of network 7 are preferably made mechanically adjustable, with the adjustments made by a pair of servo motors 15 and 18 which are connected to the variable components of the network 7 through a pair of suitable gear trains 16 and 19.

To render the system automatic, a sensing unit 3 which comprises an impedance magnitude detector 4 and a phase angle detector 5 is connected in the line 2 between the impedance matching network 7 and the transmitter 1. The impedance detector 4 as later described is a circuit which generates an error voltage when the resistance component of the input impedance to network 7 differs from the characteristic impedance of the line. This voltage has a sign and a magnitude which, as later will become apparent, is dependent on the sense and degree of difference in the two aforementioned impedances and is zero when zero difference in impedances exist.

The phase detector 5, which will also later be described in detail, is a circuit which generates an error voltage which is proportional to the phase angle between the line current and line voltage. This voltage like that derived by the impedance detector has a sign and a magnitude dependent on the sense and degree of phase angle between line voltage and current and is zero when zero phase angle exists.

Again, in power applications of the type illustrated, the error voltages generated by the detectors 4 and 5 are fed through suitable servo amplifiers 14 and 17 to the servo motors 15 and 18 which adjust the series and shunt arms 8 and 11 of the impedance matching network 7 to minimize the error voltages and thereby constantly maintain the desired impedance match.

In power applications such as herein above described, a mechanically adjustable impedance network 7 of the above type is preferred. In non-power applications, however, it may be desirable to employ reactance tubes or the like in the impedance matching network. In this case the error voltages could be used directly to perform the adjustments necessary to obtain an impedance match.

In devising this system to match a 35 foot whip antenna 6 to a 50 ohm line 2 over a frequency range of 2 to 26 megacycles it was revealed that neither of the two common types of cantilever circuits (series L and shunt C, or series C and shunt L) would suffice because, in order to obtain matching, the sign of the reactance of each of the two arms of the cantilever network must change over the broad band of frequencies utilized. Accordingly and for the purpose of matching the above identified antenna to a 50 ohm line, a compound cantilever network 7 shown in block diagram in Fig. 1 and schematically in Fig. 2 was devised. This network comprises a series arm 8 comprising a rigidly coupled variable inductance 9 and capacitance 10 electrically connected in series, and a shunt arm 11 comprising a rigidly coupled variable inductance 12 and capacitance 13 electrically connected in parallel. In operation variable inductance 12 and capacitance 13 are mechanically coupled and driven by servomotor 15 so that when inductance 12 reaches minimum inductance, capacitance 13 reaches minimum capacitance and when inductance 12 reaches maximum inductance, capacitance 13 reaches maximum capacitance. Similarly variable inductance 9 and capacitor 10 are coupled together and driven by servomotor 18 so that when inductance 9 reaches a minimum, capacitance 10 also reaches a minimum and when inductance 9 reaches a maximum capacitance 10 also reaches a maximum.

Attention is now directed to the phase angle detector of Fig. 3, which has been designed to produce an error voltage when the line voltage and line current are out of phase. This error voltage causes the series arm 8 to be driven until the phase difference is eliminated from the line. In this figure, 20 represents an inductance which is shown as a coil, but which is actually a portion of one conductor 21 of the line 2, since a coil does not operate satisfactorily at ultra-high frequencies because of the difficulty in adjusting a coil at such frequencies due to the excessive inductance under those conditions. Condensers 22 and 23 operate as a voltage divider leading from a center tap on inductance 20 to center tap 24 for inductance 25 dividing the latter into two equal branches 26 and 27. Inductance 25 is preferably a U-shaped wire or copper tubing for the same reasons stated for inductance 20. In practice the distributive capacitance between inductances 20 and 25 will suffice for condenser 22. Branch 26 leads to rectifier crystal 28 and resistor 30 to a common coupling 31. Condenser 29 is located in a condenser branch in parallel with resistor 30. Branch 27 leads to rectifier crystal 32 and resistor 34 to common coupling 31. Condenser 33 is located in the same condenser branch as condenser 29 and is in parallel with resistor 34. A suitable radio frequency impedance 35 couples center tap 24 to common coupling 31 and is also connected to the condenser branch between condensers 29 and 33. A conventional $\pi$-section A. C. filter 36 couples the resistors 30 and 34 to output terminals 37 across which a voltmeter (not shown) may be placed.

In the phase angle detector circuit of Fig. 3, three conditions must be imposed in order to render satisfactory service. These are:

(*a*) The unit output must be zero when the phase angle between the line voltage and line current is zero, (*b*) The unit output must change in direction with a change in sign of the phase angle, and (*c*) The rate of change of output of the unit with respect to phase angle must be greatest in the vicinity of zero phase angle so that the sharpest tuning effect may be obtained when the current and voltage of the line are approximately in phase.

There are two components of the voltage in branches 26 and 27 of the phase angle detector circuit. These are the voltage directly received from the line 21 and built up on condenser 23 at center tap 24 and the voltage induced from the current in the line 21. The former voltage is in phase with the line voltage whereas the induced voltage is 90° out of phase with the line current. The induced voltage in branches 26 and 27 are equal in magnitude, but if the load contains reactance elements, then the phase relation of the induced voltage is other than 90° with respect to the voltage directly received. Referring to Figs. 5 and 6, $V_c$ is the voltage across condenser 23, $V_1$ is the voltage induced in branch 26 by the electromagnetic field produced by the line current and $V_2$ is the voltage induced in branch 27 by the same field. $V_3$ and $V_4$ represent the vector sums of the induced voltage plus the voltage impressed on condenser 23 in the respective branches. Branch 26 is coupled to crystal rectifier 28 to permit positive pulses of $V_3$ to be passed through resistor 30 to coupling 31. Condenser 29 acts as a storage device and tends to smooth the pulses of energy passing through resistor 30. Branch 27 is a mirror image of the circuit of branch 26 and is coupled to crystal rectifier 32 to allow positive pulses of $V_4$ to be passed through rectifier 32 and resistor 34 and to oppose the pulse through resistor 30. Condenser 33 acts in a manner similar to condenser 29. Any A. C. in this circuit is filtered out by means of filter 36. Any potential difference between points 30′ and 34′ are impressed across terminals 37 of Fig. 3. This indicates that $V_3$ and $V_4$ are unequal due to reactance in the load. This potential is magnified by amplifier 17 and used to drive servo motor 18 which operates a gear train which causes the series arm 8 of the cantilever network 7 to operate. This causes a rotation of mechanically coupled inductor 9 and capacitor 10 which are electrically in series. Both components of series arm 8 can be varied continuously. Motor 18 continues to operate the gear train 19 until there is no potential to drive it. Then, the load has no reactive component. Should there be no reactive component in the load originally, no voltage is present to drive the motor 18, since the magnitude of $V_3$ and $V_4$ are equal as seen in Fig. 6. The phase angle between line voltage and line current is zero under these circumstances.

Fig. 4 shows a schematic diagram of the impedance-magnitude detector designed to produce an error voltage when the total impedance of the antenna 6 and cantilever network 7 differs from the fixed line impedance. This error voltage causes shunt arm 11 to be driven until the impedances are matched. In this figure, condensers 38 and 39 form a voltage divider from center conductor 21. The ratio of capacitances of the condensers is such that the ratio of voltage across the condensers is approximately equal to the ratio of the desired load impedance to the resistance of resistor 40, which latter resistor is placed in the center conductor 21. Shunted across resistor 40 are condenser 41 and crystal rectifier 42. These latter three elements are grounded via radio-frequency choke coil 43. A line running from a tap between condenser 41 and crystal 42 to a tap between condensers 38 and 39 contains a pair of resistances 44 and 46 and a potentiometer 45. Crystal 48 is coupled to this line near the tap between condensers 38 and 39. Condenser 39 and crystal rectifier 48 are also coupled via the ground. Both ends of the potentiometer 45 are coupled to condensers 47 which are grounded to form a radio-frequency by-pass. Tap 49 of potentiometer 45 is coupled to terminals 51 across which a D. C. voltmeter (not shown) may be coupled via another conventional $\pi$-shaped filter 50, similar to filter 36 in the phase angle detector circuit.

The operation of the impedance-magnitude detector of Fig. 4 is dependent on meeting the following requirements:

(*a*) The output voltage or current of the unit must be a function of the ratio of load impedance to the surge impedance of a line, (*b*) The output must be zero when the load impedance equals the magnitude of the characteristic impedance of the line, and (*c*) The sign of the output voltage must change when the ratio of load impedance to the surge impedance changes from greater than one to less than one and vice versa. It is also desirable, but not necessary, that the sensitivity of the unit not be a function of frequency. Condensers 38 and 39 form a voltage divider so that the voltage across condenser 38 ($V_{38}$) bears a desired ratio to the voltage across condenser 39 ($V_{39}$). The resistance of resistor 40 is such that the potential drop across resistor 40 equals $V_{39}$, the voltage across condenser 39, when a known impedance equal to the surge impedance is the load. Since the potential supplied by condenser 39 via crystal rectifier 48 tends to raise the potential at tap 49 and the potential supplied by resistor 40 via crystal rectifier 42 tends to lower the potential at that tap, there will be no potential at tap 49 on potentiometer 45 provided the potentials are equal. Should there be a slight inequality in potentials supplied through the crystal rectifier circuits, the tap on potentiometer 45 may be adjusted to give zero potential at the tap when a known load equal to the surge impedance of the line is carried in the load circuit. For example, the load impedance ($Z_L$) at balance (zero potential at tap 49) is determined by the ratio of potentials across condensers 38 and 39 ($V_{39}/V_{38}$) and the fixed resistance 40 ($R_1$). As an illustration, if $V_{39}/V_{38}$ is $\frac{1}{49}$ and the resistance of resistor 40 is 1 ohm, then at balance $Z_L$, the load impedance, is 49 ohms. Assuming that the phase angle detector has already been tuned so that $\phi$ equals 0, this makes $Z_L=49+j0$. Adding the resistance of resistor 40 yields the input impedance to the sensing units plus the tuning components plus the antenna. This impedance, which is the terminal impedance of the transmission line, is $50+j0$ ohms, the characteristic impedance of the line.

The impedance magnitude detector is first zeroed by placing a pure resistance of 49 ohms as the load. The capacities of condensers 38 and 39 are so chosen that they are in the ratio of approximately 49 to 1. Tap 49 on potentiometer 45 is then adjusted until zero voltage is registered on a voltmeter connected across terminals 51. A simple screwdriver slot arrangement can suffice for this adjustment.

The known resistance is then removed and the impedance magnitude detector is inserted in the system shown in Fig. 1. It is noted that the detector 4 is coupled at upper terminal 51 to amplifier 14 which excites motor 15 to drive gear train 16 which causes rotation of the electrically paralleled and mechanically coupled inductance 12 and capacitance 13 of the shunt arm 11 of cantilever network 7 when there is a residual potential at tap 49 which is transmitted across output terminals 51.

The only approximation made here is neglecting the effects of the shunt impedance of condensers 38 and 39 connected from line to ground on the input impedance to the unit. This error can be kept negligibly small by keeping the reactance of the combination of condensers relatively high compared to 50 ohms throughout the operating frequency range.

The desirable feature of sensitivity insensitive to frequency is also attained because $V_{38}/V_{39}$ is not a function of frequency and $R_1$ is a pure resistance over the frequency range utilized.

A note on sensitivity is in order at this point. The sensitivity of the unit can be varied by varying the resistance of $R_1$ and the ratio $V_{38}/V_{39}$, increased sensitivity being obtained by increasing $R_1$, and at the same time increasing $V_{38}/V_{39}$ accordingly, so that $Z_L$ is still equal to the known load at balance. This added sensitivity must be paid for in additional power dissipated in $R_1$. A compromise must therefore be made, maintaining adequate sensitivity with a minimum power dissipation in $R_1$.

In order to speed up the action of the system, servomotor 18 is made to operate four times as rapidly as servomotor 15. This enables the phase to be brought into equilibrium rapidly and there is no necessity for the impedance magnitude system to have to compensate continually while there remains a diminishing reactance component in the load impedance. By this arrangement, any reactance is quickly eliminated and the impedance magnitude detector operates to match a pure resistance, rather than an impedance containing a variable reactance component.

While the relative positions of the impedance magnitude detector and phase detector within the sensing unit may be reversed from the arrangement shown in the drawing, it has been found preferable to have the phase detector placed close to the antenna.

A device which automatically compensates for changes in load impedance due to both a change of phase between voltage and current and also a change in impedance magnitude has been provided. In arriving at a solution to this problem, the problems of providing phase matching and impedance magnitude matching have been solved. It is understood that the solution of these latter problems also provides a detecting means to measure phase angle and also a means to measure impedance magnitude. These measurements may be accomplished by placing properly calibrated D. C. voltmeters across terminals 37 to measure phase angle and across terminals 51 to measure impedance magnitude.

The invention described herein is not to be construed as limited to the specific embodiment described, but is to be considered as limited only by the scope of the disclosure.

The invention described herein may be manufactured and used by or for the Government of the United States of America for governmental purposes without the payment of any royalties thereon or therefor.

What is claimed is:

1. Apparatus for automatically matching the impedance of a load to an energy source over a wide range of frequencies comprising: a network coupling the energy source to the load including, a first circuit coupled between said source and said load and responsive to a difference in phase between load voltage and current and a second circuit responsive to a load impedance different from a predetermined magnitude, a first amplifier coupled to said first circuit, a first driving means coupled to said first amplifier, a first operating means coupled to said first driving means and driven thereby, a cantilever network coupled between said source and said load and having a series arm and a shunt arm, said series arm comprising a variable inductance and a variable capacitance electrically connected in series and rigidly coupled so that the inductance reaches maximum inductance when the capacitance reaches maximum capacitance and the inductance reaches minimum inductance when the capacitance reaches minimum capacitance, said shunt arm comprising a variable inductance and a variable capacitance electrically connected in parallel and rigidly coupled so that the inductance reaches its maximum when the capacitance reaches its maximum and the inductance reaches its minimum when the capacitance reaches its minimum, the series arm being coupled to said first operating means and driven thereby to eliminate the phase difference in the load, a second amplifier coupled to said second circuit, a second driving means coupled to said second amplifier, a second operating means coupled to said second driving means and driven thereby, the shunt arm of said cantilever network being coupled to said second operating means and driven thereby to cause the load impedance to match the predetermined magnitude.

2. In apparatus for automatically matching the impedance of a load to an energy source, a network coupling said load to said energy source including a phase angle detector and an impedance magnitude detector, means coupled to said phase angle detector circuit and driven by said circuit to change the reactive impedance of the load until the phase difference between the line current and voltage is zero, said impedance magnitude detecting circuit comprising a capacitive voltage divider connected across said source, a first rectifier coupled across a portion of said capacitive voltage divider, a second voltage divider in shunt with said capacitive voltage divider which comprises the load to be matched and a resistance of known value in series therewith, a second rectifier coupled across said resistance which is oppositely polarized with respect to said first rectifier, a potentiometer coupled between the rectifier connected mid-points of said voltage dividers such that the variable tap of said potentiometer provides an output voltage which is intermediate the voltages at said midpoints, and means connected to said variable tap for varying the real impedance component of said load.

3. A circuit for measuring the impedance of a load comprising a capacitive voltage divider connected across a voltage source, a first rectifier coupled across a portion of said capacitive voltage divider, a second voltage divider in paralled with said capacitive voltage divider comprising a resistance of known impedance value in series with the load to be measured, a second rectifier coupled across said resistance which is oppositely polarized with respect to said first rectifier, the output voltages of said first and second rectifiers being equal in magnitude under given load conditions, a potentiometer connected between the rectifier connected mid-points of said voltage dividers, said potentiometer having an adjustable tap the potential at which is a function of the load impedance.

4. In apparatus for automatically matching the impedance of a load to an energy source, an impedance magnitude detecting circuit coupling the source to the load to detect the impedance difference therebetween, said impedance magnitude detecting circuit comprising a capacitive voltage divider connected across said energy source, a first rectifier coupled across a portion of said capacitive voltage divider, a second voltage divider in shunt with said capacitive voltage divider which comprises the load to be matched and a resistance of known value in series therewith, a second rectifier coupled across said resistance which is oppositely polarized with respect to said first rectifier, a potentiometer coupled between the rectifier connected mid-points of said voltage dividers, and means coupled to the variable tap of said potentiometer to vary the real impedance component of the load until the said impedance component equals the impedance of said source.

5. A circuit for measuring the impedance of a load comprising a capacitive voltage divider connected across a voltage source, a second voltage divider in parallel with said capacitive voltage divider comprising a resistance of known magnitude in series with the load to be measured, a first rectifier coupled across a portion of said capacitive voltage divider adapted to rectify negative voltages appearing thereacross, a second rectifier coupled to said resistance and adapted to rectify positive voltages appearing thereacross, the output voltage of said rectifiers being equal in magnitude under given load conditions, a potentiometer connected between the rectifier connected mid-points of said voltage dividers, said potentiometer having an adjustable tap the potential of which is a function of the load impedance, and means connected to said variable tap for varying the real impedance component of said load.

6. Apparatus for automatically matching the impedance of a load to an energy source over a wide range of frequencies comprising: a network coupling the energy source to the load including a first circuit coupled between said source and said load and responsive to a difference in phase between load voltage and current, and a second circuit responsive to a load impedance different from a predetermined magnitude, a first amplifier coupled to said first circuit, a first driving means coupled to said first amplifier, a first operating means coupled to said first driving means and driven thereby, a cantilever network coupled between said network and said load and having a series arm and a shunt arm, said series arm comprising a variable inductance and a variable capacitance electrically connected in series and rigidly coupled so that the inductance reaches maximum inductance when the capacitance reaches maximum capacitance and the inductance reaches minimum inductance when the capacitance reaches minimum capacitance, said shunt arm comprising a variable inductance and a variable capacitance electrically connected in paralled and rigidly coupled so that the inductance reaches its maximum when the capacitance reaches its maximum and the inductance reaches its minimum when the capacitance reaches its minimum, the series arm being coupled to said first operating means and driven thereby to eliminate the phase difference in the load; said second circuit comprising a first capacitive voltage divider coupled across the output of said energy source, a second voltage divider connected in parallel with said first voltage divider including a known resistance in series with said load, first rectifier means coupled across a portion of said first voltage divider adapted to rectify negative voltages appearing thereacross, second rectifier means coupled to said known resistance adapted to rectify positive voltages appearing thereacross, the output voltages of said rectifiers being equal in magnitude under given load conditions, a potentiometer coupled between the rectifier connected mid-points of said voltage dividers, said potentiometer having an adjustable tap the potential of which is a function of the load impedance; a second amplifier coupled to said adjustable tap, a second driving means coupled to said second amplifier, a second operating means coupled to said second driving means and driven thereby, the shunt arm of said cantilever network being coupled to said second operating means and driven thereby to cause the load impedance to match the predetermined magnitude.

7. Apparatus for automatically matching the impedance of a load to an energy source over a wide range of frequencies which comprises; a first circuit responsive to a difference in phase between load voltage and load current, a second circuit responsive to a load impedance different from a predetermined magnitude, and a cantilever type matching network having a series impedance arm and a shunt impedance arm, said first and second circuits and said matching network coupling said energy source to said load with said matching network directly connected to said load, means connected to said first circuit for controlling said shunt impedance arm in said matching network, said second circuit comprising a capacitive voltage divider connected across said energy source and a resistive voltage divider in parallel therewith, said resistive voltage divider comprising a resistance of known value in series with said load and the series impedance arm of said matching network, a first rectifier coupled across a portion of said capacitive voltage divider to provide a rectified output of determined polarity thereacross, a second rectifier coupled across said resistance of known value to provide a rectified output of opposite polarity with respect to that of said first rectifier, a potentiometer connected between said voltage dividers at their rectifier connected mid-points such that the variable tap on said potentiometer provides an output voltage which is a function of the load impedance magnitude, and means connected to said variable tap on said potentiometer for controlling said series impedance arm in said matching network.

8. Apparatus for automatically matching the impedance of a load to an energy source over a wide range of frequencies which comprises; a first circuit responsive to a difference in phase between load voltage and load current, a second circuit responsive to a load impedance different from a predetermined magnitude, and a cantilever type matching network having a series impedance arm and a shunt impedance arm, said first and second circuits and said matching network coupling said energy source to said load, means connected to said first circuit for controlling said shunt impedance arm in said matching network, said second circuit comprising a capacitive voltage divider connected across said energy source and a resistive voltage divider in parallel therewith, said resistive voltage divider comprising a resistance of known value in series with said load and the series impedance arm of said matching network, a first rectifier coupled across a portion of said capacitive voltage divider to provide a rectified output of determined polarity thereacross, a second rectifier coupled across said resistance of known value to provide a rectified output of opposite polarity with respect to that of said first rectifier, a potentiometer connected between said voltage dividers at their rectifier connected mid-points such that the variable tap on said potentiometer provides an output voltage which is a function of the load impedance magnitude, and means connected to said variable tap on said potentiometer for controlling said series impedance arm in said matching network.

References Cited in the file of this patent

UNITED STATES PATENTS

| | | |
|---|---|---|
| 1,768,703 | Marvel | July 1, 1930 |
| 1,964,141 | Rhodes et al. | June 26, 1934 |
| 1,985,095 | Hoare | Dec. 18, 1934 |
| 2,024,234 | Kunze | Dec. 17, 1935 |
| 2,081,690 | Unk | May 25, 1937 |
| 2,184,771 | Roosenstein | Dec. 26, 1939 |
| 2,323,076 | Paul | June 29, 1943 |
| 2,345,933 | Green et al. | Apr. 4, 1944 |
| 2,456,800 | Taylor et al. | Dec. 21, 1948 |
| 2,461,286 | Kline | Feb. 8, 1949 |
| 2,523,791 | Vahle et al. | Sept. 26, 1950 |
| 2,551,756 | Mittelmann | May 8, 1951 |
| 2,593,361 | Sziklai | Apr. 15, 1952 |
| 2,609,510 | Wilmotte | Sept. 2, 1952 |
| 2,691,132 | Sherwood et al. | Oct. 5, 1954 |

FOREIGN PATENTS

| | | |
|---|---|---|
| 71,510 | Norway | Dec. 9, 1944 |